(12) United States Patent
Schubert

(10) Patent No.: US 11,485,594 B2
(45) Date of Patent: Nov. 1, 2022

(54) SUBSTRATE HANDLING SYSTEM COMPRISING A ROBOT CELL AND METHOD FOR OPERATING THE SAME

(71) Applicant: KOENIG & BAUER AG, Würzburg (DE)

(72) Inventor: Julian Schubert, Karbach (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/609,426

(22) PCT Filed: May 13, 2020

(86) PCT No.: PCT/EP2020/063313
§ 371 (c)(1),
(2) Date: Nov. 8, 2021

(87) PCT Pub. No.: WO2020/249350
PCT Pub. Date: Dec. 17, 2020

(65) Prior Publication Data
US 2022/0144567 A1 May 12, 2022

(30) Foreign Application Priority Data

Jun. 14, 2019 (DE) .................. 10 2019 116 301.3

(51) Int. Cl.
*B65H 3/32* (2006.01)
*B65H 33/00* (2006.01)
(Continued)

(52) U.S. Cl.
CPC ............ *B65H 3/322* (2013.01); *B25J 9/0087* (2013.01); *B25J 9/1669* (2013.01); *B65H 3/325* (2013.01);
(Continued)

(58) Field of Classification Search
CPC .................. B65H 3/322; B65H 3/325; B65H 2301/42242
(Continued)

(56) References Cited

U.S. PATENT DOCUMENTS 4,623,292 A * 11/1986 Suzuki ................... B65H 33/04
414/796
4,911,608 A * 3/1990 Krappitz ................ B25J 13/086
414/796
(Continued)

FOREIGN PATENT DOCUMENTS

CN       200959139 Y     10/2007
CN       108466854 A     8/2018
(Continued)

OTHER PUBLICATIONS

International search Report of PCT/EP2020/063313 dated Aug. 31, 2020.
(Continued)

*Primary Examiner* — Thomas Randazzo
(74) *Attorney, Agent, or Firm* — Mattingly & Malur, PC

(57) ABSTRACT

A substrate handling system including an infeed system for feeding stacked substrates and including a processing machine for processing stacked substrates, and in particular a printing press for printing stacked substrates. A robot cell is provided between the infeed system and the processing machine. The robot cell comprises one or two gripper systems, each for handling a plurality of substrates. The robot cell is configured in such a way, that selectively differently stacked substrates, which are feedable by the infeed system, can be handled.

15 Claims, 7 Drawing Sheets

(51) Int. Cl.
  *B25J 9/00*    (2006.01)
  *B25J 9/16*    (2006.01)
  *B65H 33/02*   (2006.01)
  *B65H 33/04*   (2006.01)
  *B65H 33/14*   (2006.01)
  *G05B 19/418*  (2006.01)
  *B25J 11/00*   (2006.01)
  *B41F 21/05*   (2006.01)

(52) U.S. Cl.
  CPC ............ *B65H 33/00* (2013.01); *B65H 33/02* (2013.01); *B65H 33/04* (2013.01); *B65H 33/14* (2013.01); *G05B 19/41815* (2013.01); *B25J 9/0093* (2013.01); *B25J 11/0095* (2013.01); *B41F 21/05* (2013.01); *B65H 2301/42242* (2013.01)

(58) Field of Classification Search
  USPC ........................................................ 414/796
  See application file for complete search history.

(56) References Cited

U.S. PATENT DOCUMENTS

| | | | | |
|---|---|---|---|---|
| 5,017,085 A * | 5/1991 | Ishikawa | ............... | B65H 3/325 |
| | | | | 414/796 |
| 5,205,703 A * | 4/1993 | Shill | ...................... | B65H 3/322 |
| | | | | 414/796 |
| 8,777,551 B1 * | 7/2014 | Widder | .................. | B65H 3/322 |
| | | | | 414/796.6 |
| 2005/0230899 A1 * | 10/2005 | Canini | .................... | G06M 9/00 |
| | | | | 270/58.11 |
| 2013/0223968 A1 * | 8/2013 | Fleckenstein | .......... | B25J 9/0087 |
| | | | | 414/816 |
| 2015/0191323 A1 * | 7/2015 | Fleckenstein | ............ | B65H 3/50 |
| | | | | 901/31 |
| 2017/0036356 A1 * | 2/2017 | Christiansen | .......... | B65H 15/02 |
| 2017/0355540 A1 * | 12/2017 | Wick | ....................... | B65H 3/24 |

FOREIGN PATENT DOCUMENTS

| | | |
|---|---|---|
| CN | 108557463 A | 9/2018 |
| DE | 2723162 A1 | 11/1978 |
| DE | 3718601 A1 | 12/1988 |
| DE | 937995 A1 | 5/1991 |
| DE | 4220026 A1 | 9/1993 |
| DE | 10122430 A1 | 2/2002 |
| DE | 20107781 U1 | 3/2002 |
| DE | 10151917 A1 | 4/2003 |
| DE | 102010017593 A1 | 12/2011 |
| DE | 102014207515 A1 | 11/2014 |
| EP | 0790206 A1 | 8/1997 |
| EP | 1585057 A1 | 10/2005 |
| EP | 1598293 A1 | 11/2005 |
| EP | 2923978 A1 | 9/2015 |
| EP | 2923977 B1 | 7/2016 |
| EP | 2923978 B1 | 8/2016 |
| EP | 3122671 B1 | 8/2019 |
| JP | 60-48848 A | 3/1985 |
| JP | 62-8936 A | 1/1987 |
| JP | 62-8937 A | 1/1987 |
| JP | 9-237822 A | 9/1997 |
| JP | 2006-93710 A | 4/2006 |
| SE | 1450359 A1 | 9/2015 |
| WO | 2012/069056 A1 | 5/2012 |
| WO | 2015/14772 A1 | 10/2015 |
| WO | 2015/147724 A1 | 10/2015 |
| WO | 2016/148618 A1 | 9/2016 |

OTHER PUBLICATIONS

Chinese Office Action received in corresponding Chinese Application No. 202080036180.2 dated Mar. 16, 2022.

Japanese Office Action received in corresponding Japanese Application No. 2021-568578 dated Jun. 20, 2022.

Chinese Office Action received in corresponding Chinese Application No. 202080036180.2 dated Jul. 18, 2022.

* cited by examiner

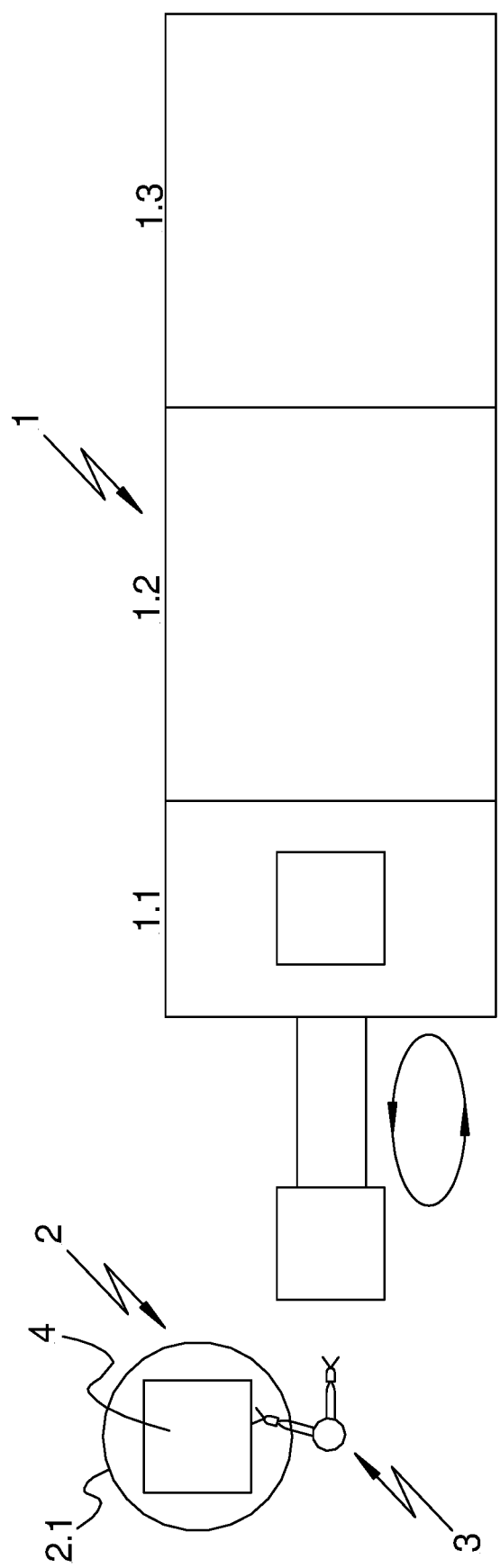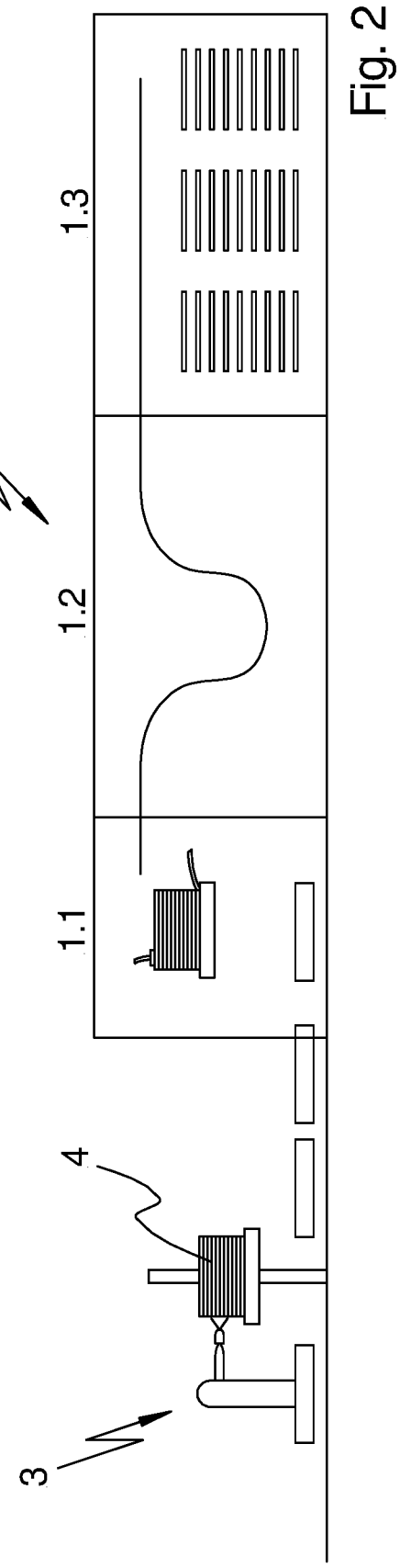

SUBSTRATE HANDLING SYSTEM COMPRISING A ROBOT CELL AND METHOD FOR OPERATING THE SAME

CROSS-REFERENCE TO RELATED APPLICATIONS

The present application is the US national phase, under 35 USC § 371, of PCT/EP 2020/063313, filed May 13, 2020; published as WO2020/249350 A1 on Dec. 17, 2020, and claiming priority to DE 10 2019 116 301.3, filed Jun. 14, 2019, the disclosures of which are expressly incorporated herein in their entireties by reference.

FIELD OF THE INVENTION

The present invention relates to a substrate handling system comprising an infeed system for feeding stacked substrates and comprising a processing machine for processing stacked substrates, and to a method for operating a substrate handling system comprising an infeed system for feeding stacked substrates and a processing machine for processing stacked substrates.

BACKGROUND OF THE INVENTION

Handling a partial pile of a pile of sheets by means of grippers in different ways is known from JP 60-48848 A.

Handling partial piles by means of grippers is known from JP 62-8936 A and JP 62-8937 A.

It is known from DE 39 37 995 A1 to use movable forks for separating reams.

A method for loading a jogging table and a device for carrying out the method are known from EP 1 598 293 A1, wherein partial piles of an overall pile are conveyed to the jogging table by gripper means.

A method and a device for handling a pile of sheets or a partial pile thereof are known from EP 2 128 056 A1, wherein initially the position and height of the pile are detected, whereupon the pile or partial pile is lifted in sections, using the previously detected position and height data, and gripped from the side, and is then handled.

It is known from EP 2 923 977 B1 and EP 2 923 978 B1 to use a gripper device, to be operated manually by means of a stick control element, for separating a partial pile from an overall pile and for transferring this partial pile to a jogging table.

Automatically handling and aerating a paper pile are known from WO 2012/069056 A1, wherein a dual-arm robot comprising gripper systems is used.

A gripper is known from WO 2015/147724 A1, which can be attached to an arm of a robot for handling flexible substrates, and the lower finger of which is provided to be inserted into an overall pile for separating the overall pile into partial piles.

A method for gripping a top stack of flexible substrates by means of grippers on a dual-arm robot is known from WO 2016/148618 A1 and already from SE 1450359 A1, wherein sensors are used to scan the substrate pile, and wherein a second lower gripper finger is used, in addition to a first lower gripper finger, and subsequently the second lower gripper finger is displaced along the pile edge into its final gripping position.

A method for handling stacks of flexible substrates is known from WO 2015/147725 A1, wherein the detected partial piles are first brought into a vertical position by grippers of a dual-arm robot and are then deposited.

DE 37 18 601 A1 shows a device for lifting off at least one material pile.

DE 101 22 430 A1 shows a buffer station in logistics for printing companies.

DE 101 51 917 A1 shows a system and a method for continuously providing individual sheets.

SUMMARY OF THE INVENTION

The object of the present invention is to devise an alternative substrate handling system and an alternative method for operating a substrate handling system. In particular, a semi-automatic or fully automatic system is to be devised, which can be adapted or is adapted to the diverse requirements.

According to the present invention, the object is achieved by the provision of a substrate handling system, including an infeed system for feeding stacked substrates and also including a processing machine for processing the stacked substrates, which processing machine, in particular, is a printing press for printing stacked substrates. A robot cell is provided between the infeed system and the processing machine. The robot cell comprises one or two gripper systems, each for handling a plurality of substrates. The robot cell is configured in such a way that selectively differently stacked substrates feedable by the infeed system can be handled. In a method for operating such a substrate handling system, the substrate piles, which are made of selectively differently stacked substrates, are fed by the infeed system.

The invention has the advantage that an alternative substrate handling system and an alternative method for operating a substrate handling system are devised. In particular, a semi-automatic or fully automatic system is devised, which can be adapted or is adapted to the diverse requirements.

BRIEF DESCRIPTION OF THE DRAWINGS

The invention shall be described hereafter by way of example. The associated drawings schematically show:

FIG. 1: a top view onto a substrate handling system comprising an infeed system, a robot cell and a processing machine;

FIG. 2: a side view of the substrate handling system comprising the processing machine and the robot cell;

DESCRIPTION OF THE PREFERRED EMBODIMENT

Figure 3:
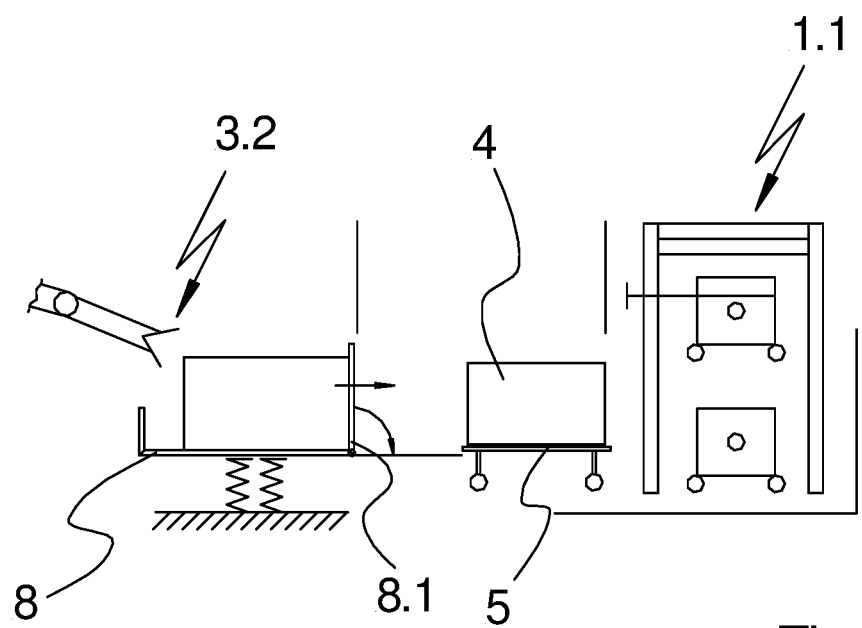
FIG. 3: a jogging table comprising a downstream non-stop feeder.

FIG. 1 and FIG. 2, for example, show a substrate handling system comprising an arbitrary processing machine 1 and a robot cell 3. A sheet processing machine, in particular a sheet printing press, can be provided as the processing machine 1. The processing machine 1 can also be a sheet offset rotary printing press, for example in a unit-based configuration and an inline configuration. The processing machine 1 can be a printing press, for example, which processes, for example prints and/or coats or numbers, cuts and/or inspects, fed substrate, in particular substrate in sheet form or tabular form, for example printing substrate sheets. The substrate handling system is preferably used to process value or banknote material.

The processing machine 1 comprises a feeder 1.1, for example, to which sheet-format substrate can be fed. An infeed unit, one or more processing mechanisms, such as printing couples 1.2, and a delivery unit 1.3 can follow the feeder 1.1 in the substrate conveying direction, for example. The processing machine 1 preferably includes a conveyor system, which is not shown in detail and conveys the substrates to be processed, for example to be printed or to be coated or to be treated, and the like, through the processing machine 1. For example, the conveyor system can comprise conveyor belts and/or rotating sheet guide cylinders, which fix the substrate at the leading edge by means of grippers and transfer it in the gripper closure. The machine, in particular the printing press, can also comprise a turning device for turning the substrates.

In the delivery unit 1.3, a chain conveyor system, comprising two delivery chains which are each guided laterally at the stand of the delivery unit 1.3 and between which gripper carriages are arranged, which convey the substrate to a delivery pile, can be configured as a conveyor system, for example. The gripper carriages can comprise sheet fixing systems for this purpose, by way of which the substrates to be conveyed can be gripped at the leading edge. From the delivery chains, the gripper carriages can be guided on a gripper carriage track in the conveying direction to beyond the delivery pile, where the gripper carriages release the substrates for deposition. One or more sheet piles can be formed in the delivery unit 1.3.

In addition to the processing machine 1 for processing stacked substrates, the substrate handling system comprises an infeed system 2 for feeding stacked substrates for processing by the processing machine 1. The infeed system 2 includes at least one staging space 2.1 for staging at least one substrate pile 4, made of individually stacked substrates, to be processed by the processing machine 1. The staging space 2.1 of the substrate is located in the area of a robot cell 3, i.e., a working zone of an industrial robot, in such a way that the robot is able to handle the staged substrate. The infeed system 2 preferably stages stacked substrates, which are fed in a stacked state on a support in the form of a pallet, for example. The substrate piles 4 provided by the infeed system 2 can, for example, be provided as overall piles, or also as partial piles separated by means of stacking or separating aids. Furthermore, the provided substrate piles 4 can also be provided in packaged and/or sealed form. The provided substrate piles 4 can, for example, have been printed in a preceding printing pass.

The substrate handling system furthermore comprises the robot cell 3, which in particular comprises a dual-arm robot 3.1, between the infeed system 2 and the processing machine 1. The dual-arm robot 3.1 preferably comprises two arms that can be moved independently of one another and that each include gripper systems 3.2, which preferably have multiple, particularly preferably at least six, degrees of freedom. The gripper systems 3.2 of the dual-arm robot 3.1 are each configured to handle a plurality of substrates. For example, each of the gripper systems 3.2 can comprise at least two gripper fingers, which can be configured to be movable toward one another for gripping. Furthermore, the gripper systems 3.2 can have pneumatic connections, in particular blower air nozzles. A separating aid for insertion into the substrate pile 4 can also be assigned to one or both gripper systems 3.2.

The infeed system 2 is in particular operated in such a way that selectively differently stacked substrates can be fed thereby. This means in particular that substrates stacked by the infeed system 2 are brought into the operating zone of the robot cell 3, in particular into the gripping zone of the dual-arm robot 3.1. In the process, the infeed system 2 can in particular feed substrate piles 4 made of substrates that are stacked without being separated or made of substrates separated by stacking aids. The substrate piles 4 made of substrates that have not been separated, or the substrate piles 4 made of substrates separated by stacking aids, are preferably conveyed by the infeed system 2 and positioned in a defined staging space 2.1. For example, pile boards 6 or spacer plates 7 can be used as stacking aids. Pile boards 6 can, for example, be inserted into the substrate pile 4 to be further processed during a preceding printing pass to separate individual partial piles.

In the robot cell 3, a respective partial pile of the substrate pile 4 positioned in the staging space 2.1 can be gripped, in particular by means of the dual-arm robot 3.1, and the gripped substrates of the partial pile can thus be separated from the remaining pile. A partial pile of a partial pile formed, for example, by pile boards 6 can be gripped or handled in the robot cell 3. However, with suitable dimensioning, it is also possible for an entire partial pile formed by way of stacking aids to be gripped or handled. In connection with the gripping or separation of a partial pile, the individual substrates of the partial pile are preferably separated among each other, for example loosened.

Furthermore, a deposition table is preferably provided in a substrate handling system, onto which the partial piles gripped by the gripper systems 3.2 can be deposited. The deposition table accommodates the substrates to be subsequently processed by the processing machine 1 by means of the gripper systems 3.2, in particular by depositing one or more partial piles. From the deposition table, the accommodated substrate pile 4 can, for example, be transferred via conveyor systems onto a pallet 5, in particular a non-stop system pallet 5. In particular in the configuration of a non-stop feeder 1.1, the substrate piles 4 accommodated on a non-stop system pallet 5 can be fed without interruption to the processing machine 1. The infeed of the sheets stacked on a pallet 5 or non-stop system pallet 5 is preferably carried out in a semi-automated or fully automated manner, for example by way of a logistic or transport system.

FIG. 3 shows a deposition table, which is preferably configured as a jogging table 8, comprising a displaceable or pivotable stop 8.1. The substrate sheets deposited by gripper systems 3.2 onto the jogging table 8 can be aligned at the stop 8.1, in particular during a jogging movement. After alignment, the stop 8.1 can be displaced or pivoted, and the fully jogged partial pile or substrate pile 4 can be fed to the processing machine 1. In particular, the fully jogged partial pile or substrate pile 4 can be transferred onto a non-stop system pallet 5. For the transfer, for example, a logistic or transport system that displaces the non-stop system pallet 5 into the zone of the jogging table 8 can be used. Conveyor systems, gripper systems and/or push systems can be used for transferring the fully jogged substrate pile 4 onto a pallet 5 or non-stop system pallet 5. The deposition table, in particular jogging table 8, however, can also comprise multiple stops assigned to different sides, which can also be used for alignment when selected appropriately. The deposition surface of the jogging table 8 can be adjusted to the selected stop side. For example, a selection of one or two stop sides from two, three or even four stop sides can be made.

The feeder 1.1 of the processing machine 1 is preferably configured as a non-stop feeder 1.1, by means of which substrate piles 4 can be fed to the processing machine 1 without interruption for processing. Such a non-stop feeder 1.1 can comprise an auxiliary pile carrier including carrier elements for this purpose, which extend beneath a residual pile through a non-stop system pallet 5 and lift it for further processing. While the residual pile is being processed, the empty non-stop system pallet 5 can be lowered, and a new substrate pile 4 can be inserted. For this purpose, for example, a new, in particular fully jogged, substrate pile 4 can be inserted on another non-stop system pallet 5 beneath the residual pile and be raised by a pile support plate. In this way, a pile reunion can take place by way of the non-stop feeder 1.1, while pulling out the carrier elements of the auxiliary pile carrier. In this way, substrates to be processed can be fed to the processing machine 1 without interruption.

During operation of the substrate handling system, stacked substrates are fed by means of the infeed system 2 to the robot cell 3, which prepares the substrate piles 4 for processing by the processing machine 1, which further processes, in particular fully automatically, the fed substrates. The robot cell 3 provided between the infeed system 2 and the processing machine 1 handles a plurality of substrates in each case using gripper systems 3.2, wherein selectively differently stacked substrates are fed by the infeed system 2. In the process, the infeed system 2 can feed substrate piles 4 made of substrates that are stacked without being separated or made of substrates separated by stacking aids.

The gripper system or systems 3.2 of the robot cell 3, in particular of the dual-arm robot 3.1, particularly preferably removes or remove stacking aids from fed substrate piles 4. For this purpose, the stacking aids can be gripped by means of one or both gripper systems 3.2 of the dual-arm robot 3.1. The stacking aids can be pile boards 6 or spacer plates 7, for example, which in particular mechanically separate different partial piles of the substrate pile 4 from one another, at least in some areas. The stacking aids, in particular pile boards 6 and/or spacer plates 7, are removed from the substrate piles 4 containing the stacking aids by means of the gripper system or systems 3.2 of the robot cell 3, in particular of the dual-arm robot 3.1. Accordingly, the stacking aids are preferably deposited in a collection space and/or in a collection container.

The stacking aids, such as pile boards 6 and/or spacer plates 7, are preferably sorted out and/or collected. A collection space and/or a collection container can be provided for collection for example, in which the stacking aids, in particular pile boards 6 or spacer plates 7, are deposited by the gripper system or systems 3.2 of the robot cell 3. The stacking aids, in particular pile boards 6 or spacer plates 7, can, for example, be transported to the collection space or into the collection container by means of one or both gripper systems 3.2 of the dual-arm robot 3.1. It is also possible for multiple collection spaces or collection containers intended for different stacking aids to be provided, for example. In this way, it is also possible to separate different stacking aids or different types of stacking aids.

Figure 4:
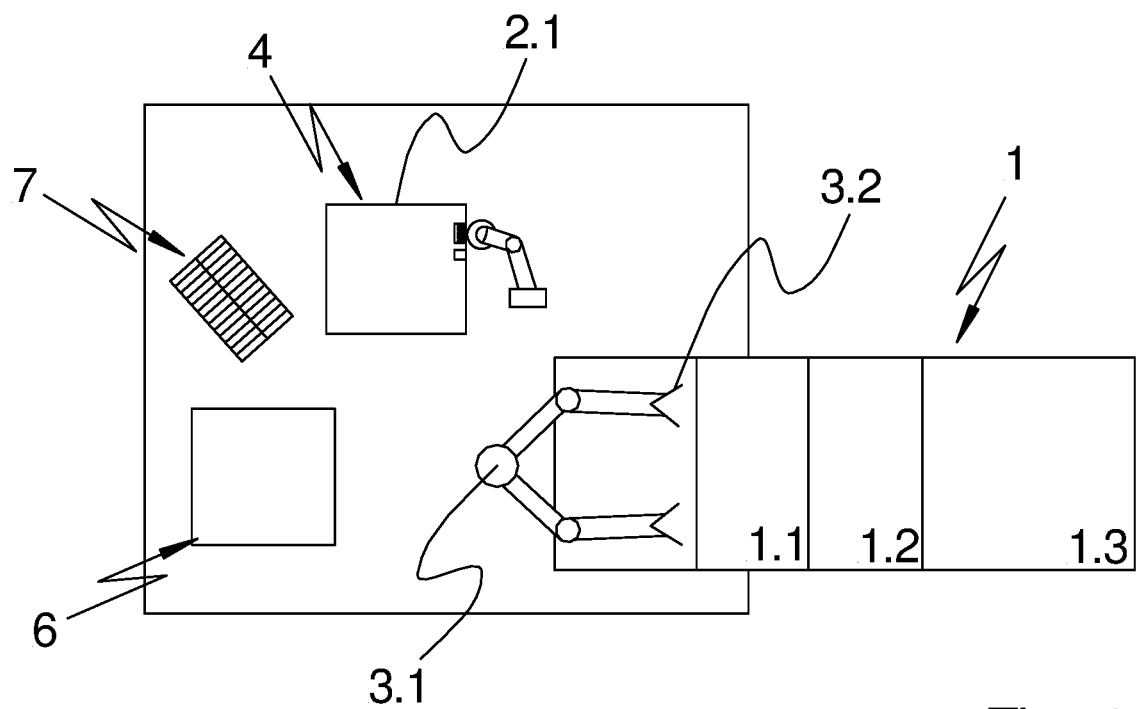
FIG. 4: a system for automatically preparing banknote sheets.

FIG. 4, for example, shows a substrate handling system for automatically preparing in particular banknote sheets from above during the production process. A substrate pile 4 to be processed can be fed to a robot cell 3 by an infeed system 2. The dual-arm robot 3.1 can handle the substrate pile 4 staged by the infeed system 2 in the staging space 2.1 by way of its gripper systems 3.2. Furthermore, a storage area for pile boards 6 and/or a storage area for spacer sheets 7 are provided in the handling zone of the dual-arm robot 3.1. For example, the dual-arm robot 3.1 can align and/or rotate or turn partial piles accommodated in the handling zone. For example, gripped partial piles can preferably be rotated by 180°.

Figure 5:
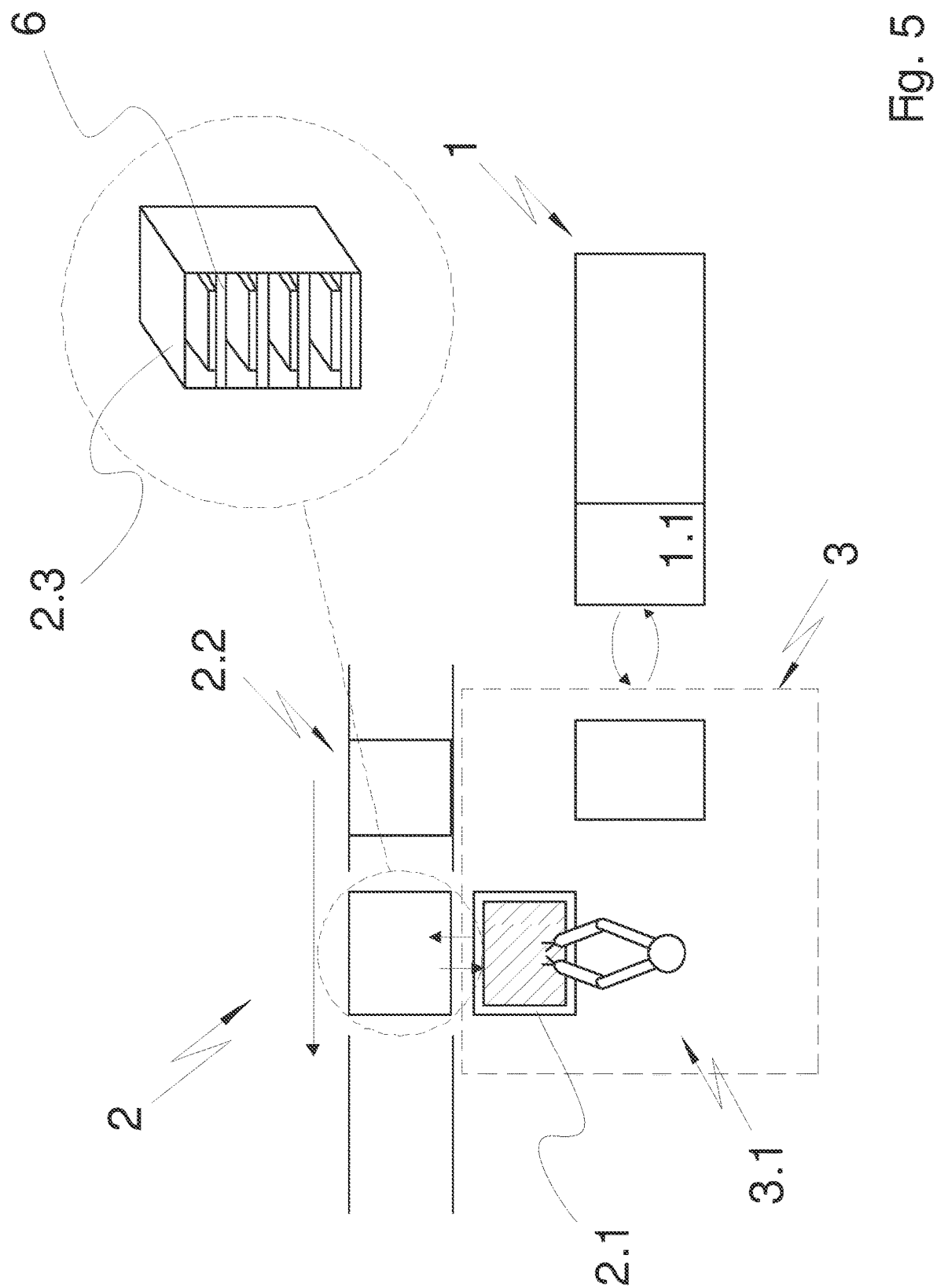
FIG. 5: an infeed system comprising a logistic system for transporting containers containing substrate piles.

FIG. 5 shows a top view onto an infeed system 2 comprising a logistic system 2.2, in particular for transporting containers 2.3 containing substrate piles 4. The logistic system 2.2 can comprise conveyor systems, such as conveyor belts, for example, which can displace pallets 5 and/or one or more containers 2.3. In the process, a pallet 5 or a container 2.3 can be conveyed by the logistic system 2.2 to the staging space 2.1 or be positioned in the staging space 2.1, in particular in an automated manner.

Such a container 2.3 can contain substrate sheets to be processed. The container 2.3 preferably provides partial piles separated by means of stacking aids, in particular pile boards 6. Loading the container 2.3 with substrate sheets or with pile boards 6 and partial piles can be carried out, for example, by the infeed system 2 or upstream, for example manually or in an automated manner. A container 2.3 thus loaded with pile boards 6 and substrate sheets can be placed onto a conveyor belt, for example. By means of the infeed system 2, this container 2.3 then moves into the staging position 2.1 to the robot cell 3 for automated pile preparation. In the staging space 2.1, a respective pile board 6, including 100 to 500 substrate sheets, for example, can be removed, in particular by the dual-arm robot 3.1. The dual-arm robot 3.1 preferably removes the substrate sheets from the pile board 6 and handles or manipulates (aerates, loosens, etc.) them. Afterwards, the dual-arm robot 3.1 can push the pile board 6 back into the container 2.3, or also feed it to a collection space or into a collection container.

Preferably, an empty pallet 5 or an empty container 2.3 can be transported away or removed by a or the logistic system 2.2. The logistic system 2.2 can be configured in such a way that a new pallet 5 or a new container 2.3 is already being fed. In this way, substrates to be handled can be continuously provided to the robot cell 3, in particular the dual-arm robot 3.1, on pallets 5 and/or in containers 2.3.

In particular, a pallet 5 including a substrate pile 4 can be placed, for example by an operator, onto a conveyor belt of the logistic system 2.2, which feeds the pallet 5 to a positioner, in particular a lifting element, of the staging space 2.1 for vertical displacement. In particular, the pallet 5 is transported by the logistic system 2.2 into a lifting frame in the area of the staging space 2.1. The positioning in the staging space 2.1 can be carried out depending on the sheet format. In particular, the pallet 5 can be lifted above the lifting frame to a working height for the dual-arm robot 3.1 or the gripper systems 3.2. The dual-arm robot 3.1 in particular removes a defined number of sheets, for example diagonally or at the leading edge, etc., depending on a defined gripping pattern. It may likewise be provided to secure the substrate sheets by way of a hold-down device to prevent sliding, in particular during a counting process or during removal. For example, this can take place by a movable hold-down device provided in the area of the lifting frame. The respective uppermost substrate sheet can be fixed from above by one or more hold-down elements, for example.

After gripping the substrate sheets, the dual-arm robot 3.1 can carry out a "loosening and aeration movement" while transporting the substrate sheets to a deposition side. With respect to the dual-arm robot 3.1, the deposition side can, for example, be provided approximately perpendicularly to the staging space 2.1. For example, the substrate sheets are deposited there onto a non-stop rake. During deposition, the new substrate pile 4 can be aligned, for example by means of a four-sided vibrator, wherein selectively different reference edges can also be chosen. The non-stop rake can in particular move downwardly, in particular when further partial piles are being deposited, so that the deposition height remains constant for the dual-arm robot 3.1. If the new substrate pile 4 has to be turned, a turning device can be used. The turning device can be provided above the non-stop rake, for example. On the turning device, the sheets can be guided with an edge between rods, for example, and a turner bar subsequently rotates for turning. This movement advantageously avoids bent sheet edges and dog ears.

When the substrate pile 4 positioned in the staging space 2.1 has been processed, the non-stop rake carrying the handled substrate sheets preferably moves onto a new non-stop system pallet 5 located at the bottom. The non-stop rake is preferably lowered vertically until its carrier rods recede into the recesses of the non-stop system pallet 5, so that the substrate sheets are transferred to the non-stop system pallet 5. After a forward carrier beam provided for the non-stop rake has been removed, the non-stop system pallet 5 carrying the substrate sheets to be processed by the processing machine 1 can be removed, preferably in an automated manner. In particular, the empty pallet 5 or the empty container 2.3 on the input-side of the robot cell 3, in particular in the staging space 2.1, is also removed. For example, empty pallets 5 can be transported beneath the dual-arm robot 3.1, in particular into a magazine. This can likewise be carried out by the logistic system 2.2.

Figure 6:
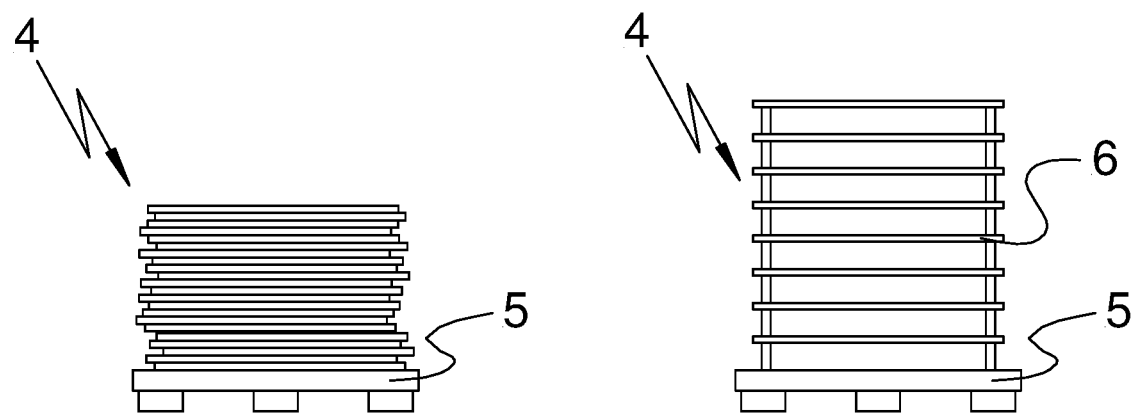
FIG. 6: substrate piles feedable to a substrate handling system.

FIG. 6, for example, shows substrate piles 4 fed by the infeed system 2 in the substrate handling system. On the left, an unprepared substrate pile 4 is shown, as it can be transported by the infeed system 2 to the robot cell 3. For example, the substrate pile 4 can have oblique or rippled edges and/or include protruding individual or multiple sheets. On the right, a substrate pile 4 including stacking aids is shown. For example, the substrate pile 4 can contain partial piles separated by pile boards 6 or spacer plates 7.

Figure 7:
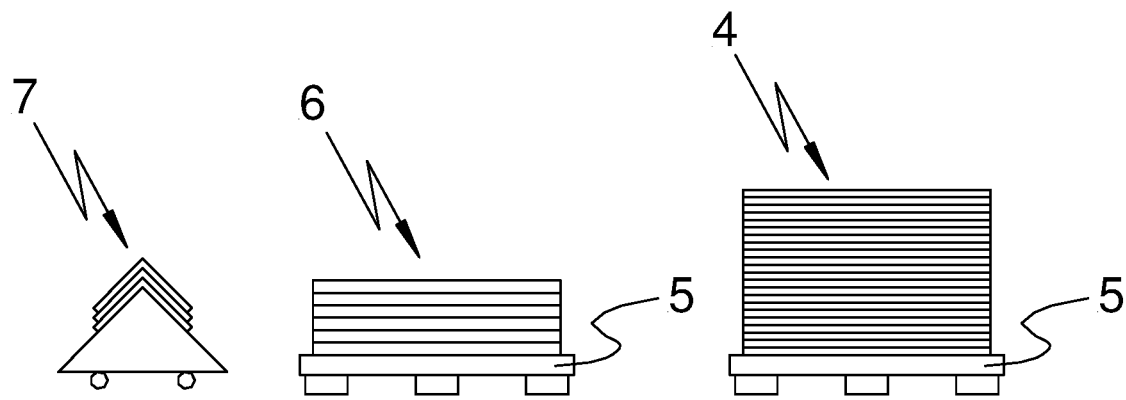
FIG. 7: a substrate pile processed by the substrate handling system and collected stacking aids.

FIG. 7, for example, shows a substrate pile 4 processed by the substrate handling system and collected stacking aids. The processed substrate pile 4 can be staged on a pallet 5 or non-stop system pallet 5 by the robot cell 3 or by the processing machine 1. The substrate pile 4 can preferably be staged as an aligned pile of sheets without inserted stacking aids. If stacking aids are originally present, these can be kept available by a collection container or a collection space, in particular for reuse. For example, pile boards 6 can likewise be collected on a pallet 5. Spacer plates 7 can be provided in a storage area, for example. Using a logistic or transport system, the finished substrate piles 4 and/or the collected stacking aids, in particular pile boards 6 stacked on a pallet 5 and/or spacer plates 7 collected in a container, can be displaced or transported in an automated manner.

A new substrate pile 4 is delivered in the substrate handling system by the infeed system 2, in particular in the defined staging space 2.1. The substrate pile 4 can have been generated or formed by a processing machine, for example as described above. Preferably, partial piles are gripped by the robot cell 3 from the fed substrate piles 4 while the substrate pile 4 is being handled, and the substrates of the particular partial pile are handled, in particular separated, or separated among one another, loosened and/or aerated. In the process, a fed substrate pile 4 can also be detected by way of sensors in the substrate handling system and in particular be handled in a differentiated manner corresponding to the sensor values. The robot arms or gripper systems 3.2 of the robot cell 3, in particular of the dual-arm robot 3.1, are preferably controlled by open-loop or closed-loop control as a function of the ascertained fed substrate piles 4 in accordance with predefined handling instructions.

Substrate piles 4 placed in the defined staging space 2.1 preferably undergo an incoming pile inspection by optical measuring systems, if necessary following a release or start signal. For example, the geometry of the substrate pile 4 can be checked (format, size of container, height, ripples etc.) and/or the pile quality can be checked (e.g., for protruding sheets). The geometry of the substrate pile 4 can be detected by means of an optical measuring system, for example by means of a camera, in particular a 3D camera, and/or a laser scanner, and be compared to an ideal. If the deviations are greater than defined, the relevant substrate pile 4 can be rejected by the system or not be released for processing. Additionally, it is possible for the system to process the substrate pile 4 up to the point or position that deviates from the ideal, and to then notify the operator, so as to solve the problem at hand (e.g., in the case of a protruding single sheet). Afterwards, the substrate pile 4 can then be further processed by the system.

In the process or in this connection, a sheet detection can preferably be carried out, preferably by transmitting ascertained data to the robot cell 3 and/or the processing machine 1, in particular a printing press. Particularly preferably, the upper substrate sheet can be identified, if necessary by ascertaining an associated lot number. This can in particular result in knowledge about all sheets or substrates present in the current lot. This information is preferably transmitted to the processing machine 1, for example the printing press, in particular when it is connected inline. As an alternative or in addition, data can be stored, for example for documentation purposes, in particular in the system.

Furthermore, sheets or substrates can be counted. The counting of sheets can in particular be carried out mechanically. The substrate sheets can be counted to a previously set value by means of a mechanical feeler, which is attached to a linear axis or a robot arm or a gripper system 3.2 or a separate arm. For example, an exact number of substrate sheets can be necessary during final processing. This is carried out, in particular, by way of mechanical vacuum counting disks 9 and cannot be carried out by indirect measurement (pile height, visual features, etc.). Moreover, this counting can be used for the purpose of seamlessly tracing the substrates or print substrates.

Figure 8:
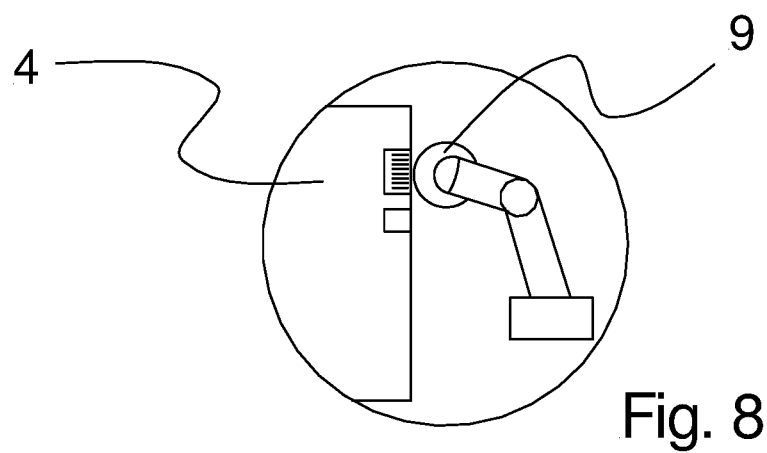
FIG. 8: a vacuum counting disk for counting substrate sheets.

FIG. 8, for example, shows a vacuum counting disk 9, which can be used in the substrate handling system, in particular in the robot cell 3, for counting the exact number of substrate sheets. In this connection or at the same time, a feature, such as a lot number, associated with the substrate pile 4 can be identified by way of a measuring system.

The substrate sheets can be separated from the substrate pile 4 by means of the gripper systems 3.2 in such a way that a number of precisely counted substrate sheets is separated from the substrate pile 4 and subsequently gripped. For a counting process, for example a gap can be formed in the substrate pile 4, wherein in particular a plate, configured in a wedge shape for example, can separate a partial pile from the main pile. The partial pile to be counted can also rest on the plate across the entire sheet width during the counting process. Thereafter, the defined number of substrate sheets can be counted by way of a measuring system, in particular the vacuum counting disk 9, and preferably be separated, or be segregated for gripping. If no counting took place, an approximate number of substrate sheets can be removed or gripped. However, this amount can also be ascertained, e.g., by optical height measurement.

Depending on the fed substrate, a movement, in particular previously defined by the operator, can be carried out with the substrate sheets in the robot cell 3, in particular by the dual-arm robot 3.1. This movement can in particular be used to break up or free the substrate sheets. For example, such information can be ascertained from the detected features, such as the lot number.

Figure 9:
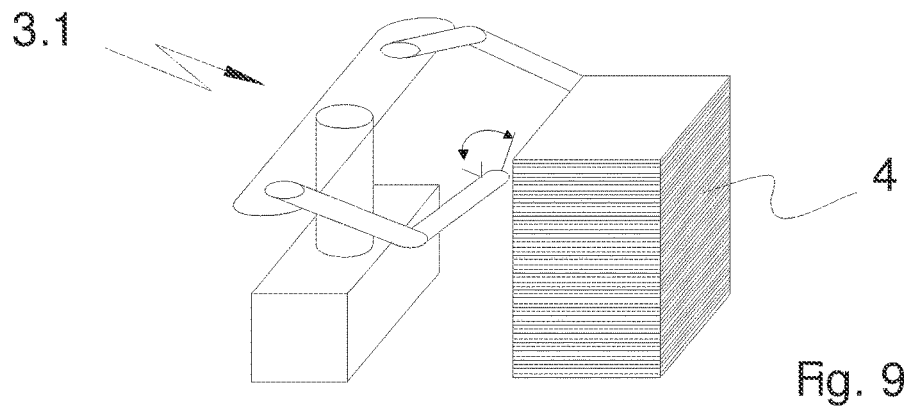
FIG. 9: a dual-arm robot comprising an interchangeable gripper.

FIG. 9 shows a dual-arm robot 3.1, for example, comprising an interchangeable gripper. A vacuum counting disk 9, serving as the interchangeable gripper, is arranged directly at the robot or at a robot arm. Accordingly, the vacuum counting disk 9 can be activated or brought into position, so that the dual-arm robot 3.1, together with the vacuum counting disk 9, can move into the substrate pile 4. The vacuum counting disk 9 or the robot arm stops after a defined number of substrate sheets. Thereafter, for example, the substrate pile 4 can move downwardly, or the robot arm, together with the vacuum counting disk 9, moves upwardly in such a way that a gap arises as a result of the relative movement. Thereafter, one gripper system 3.2, for example the opposite gripper system 3.2 of the dual-arm robot 3.1, can reach into the substrate pile 4 and handle the counted partial pile. During this time, the arm of the dual-arm robot 3.1 comprising the interchangeable gripper can change the tool, for example using a gripper revolver at the arm or externally, and continue with the separation.

Figure 10:
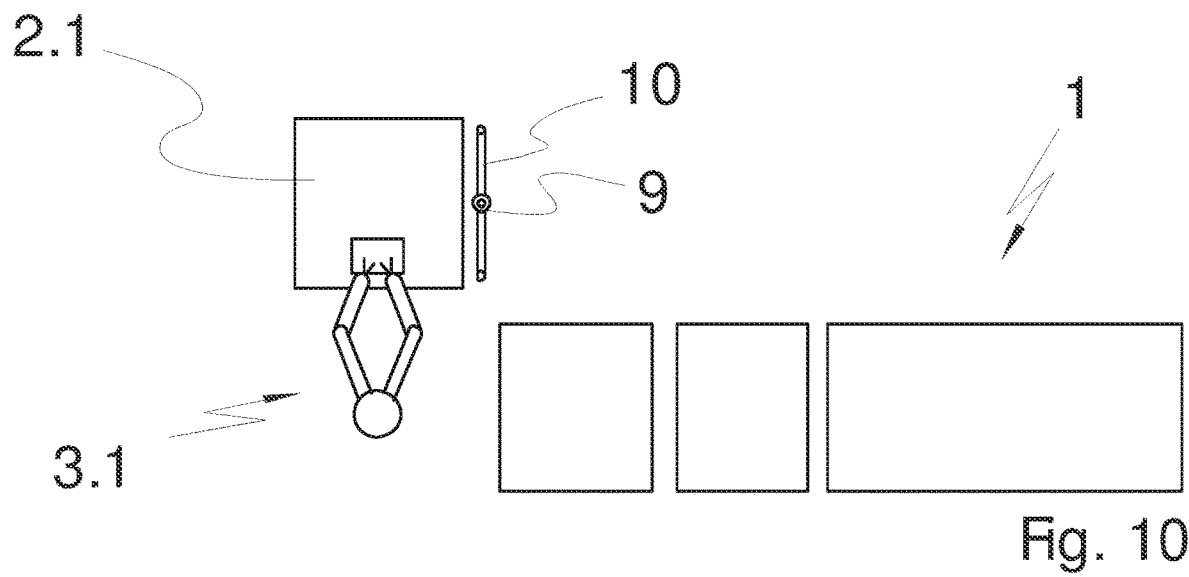
FIG. 10: a top view onto a robot cell comprising a vacuum counting disk arranged at a frame.

FIG. 10 shows a top view onto a robot cell 3 comprising a vacuum counting disk 9 arranged at a frame 10. The frame 10 can be provided adjoining the staging space 2.1, for example, and be rigidly or movably configured. For example, the frame 10 can include one or more linear axes for movably accommodating a vacuum counting disk 9.

Figure 11:
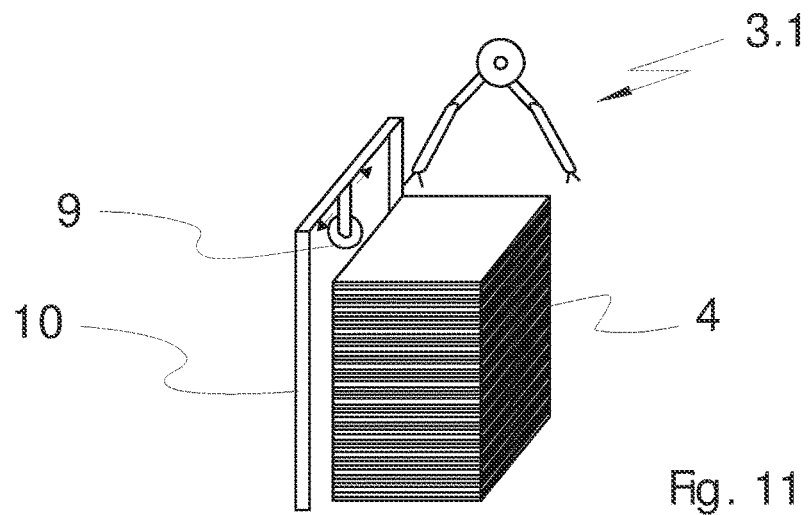
FIG. 11: a vacuum counting disk arranged at a frame.

FIG. 11 shows a vacuum counting disk 9 arranged at the frame 10 for counting the substrate sheets of the substrate pile 4. The vacuum counting disk 9 is attached to the outside of the frame 10 or mount. The movable vacuum counting disk 9 moves into the substrate pile 4 until a defined number of substrate sheets is reached. Thereafter, the mechanical feeler inserted between two immediately adjoining substrate sheets moves upwardly a certain distance and/or the substrate pile 4 is moved downwardly a certain distance, in such a way that a gap arises as a result of the relative movement. Thereafter, one gripper system or both gripper systems 3.2 can reach into the substrate pile 4 and grip and handle the counted partial pile.

Figure 12:
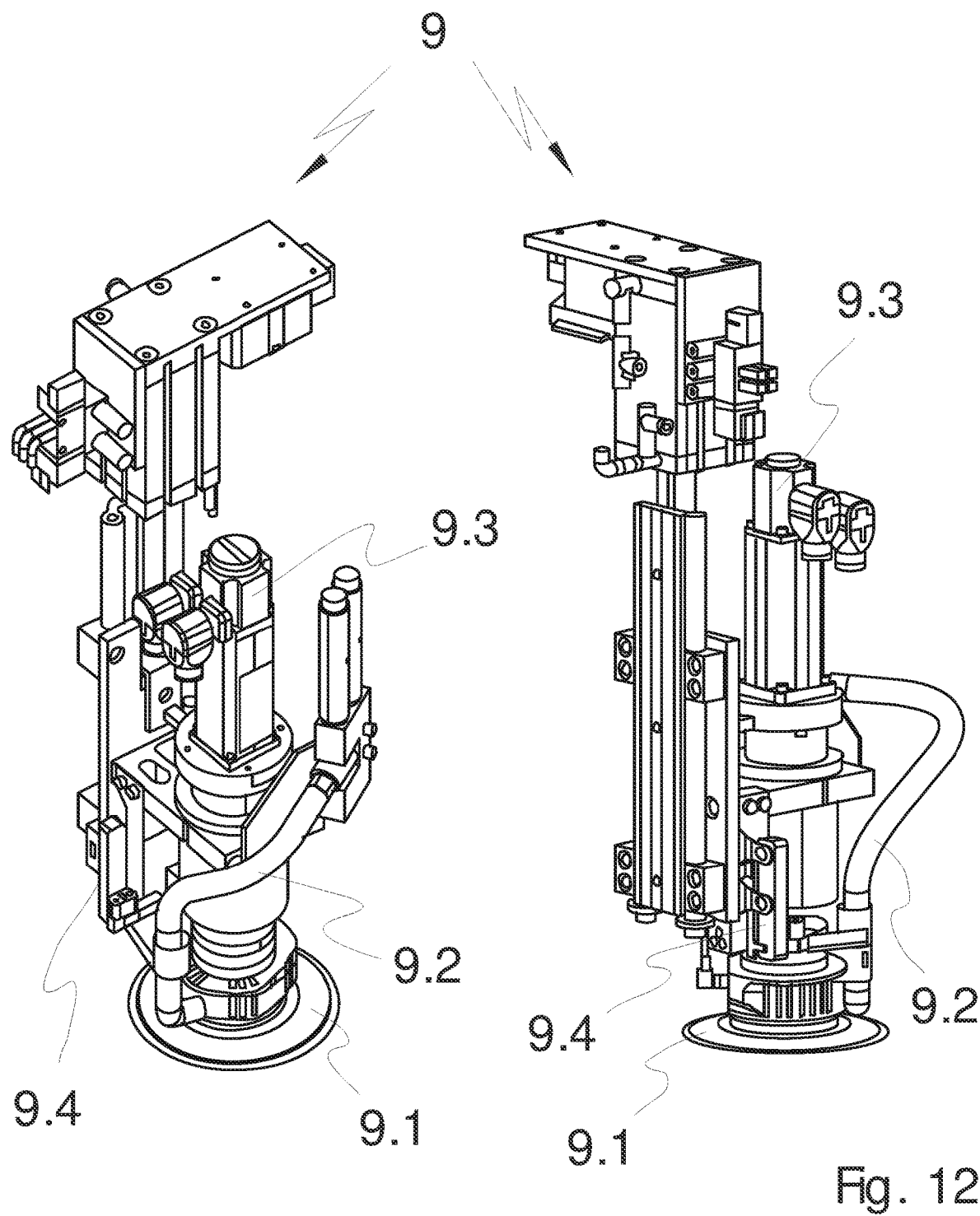
FIG. 12: perspective views of a vacuum counting disk.

FIG. 12 shows perspective views of a vacuum counting disk 9 for counting the exact number of sheets of the substrates to be handled. The exact number of sheets of the substrates is counted by means of a mechanical feeler, in particular a counting disk 9.1, moving between the substrates, and, when a sufficient or intended number is present, the substrates are separated so as to form a gap. The vacuum counting disk 9 can be provided at an arm of the dual-arm robot 3.1 or at the separate frame 10, or also at a separate arm.

A vacuum counting disk 9 can comprise a motor 9.3, for example, which rotatorily drives the counting disk 9.1. Negative pressure can be supplied to the counting disk 9.1 by means of a vacuum hose 9.2, which is used to apply suction to and lift the uppermost substrate sheet on the underside of the counting disk 9.1. The rotatorily driven counting disk 9.1 has at least one specific recess, which is not shown in greater detail, at its circumferential edge so as to individually detect each substrate sheet while rotating. In the process, the counting disk position is determined, in particular by way of a measuring device 9.4. Since the counting disk 9.1 extends beneath each substrate sheet individually during the counting process, a gap can be generated at a defined number of substrate sheets for handling the counted partial pile by the dual-arm robot 3.1.

Figure 13:
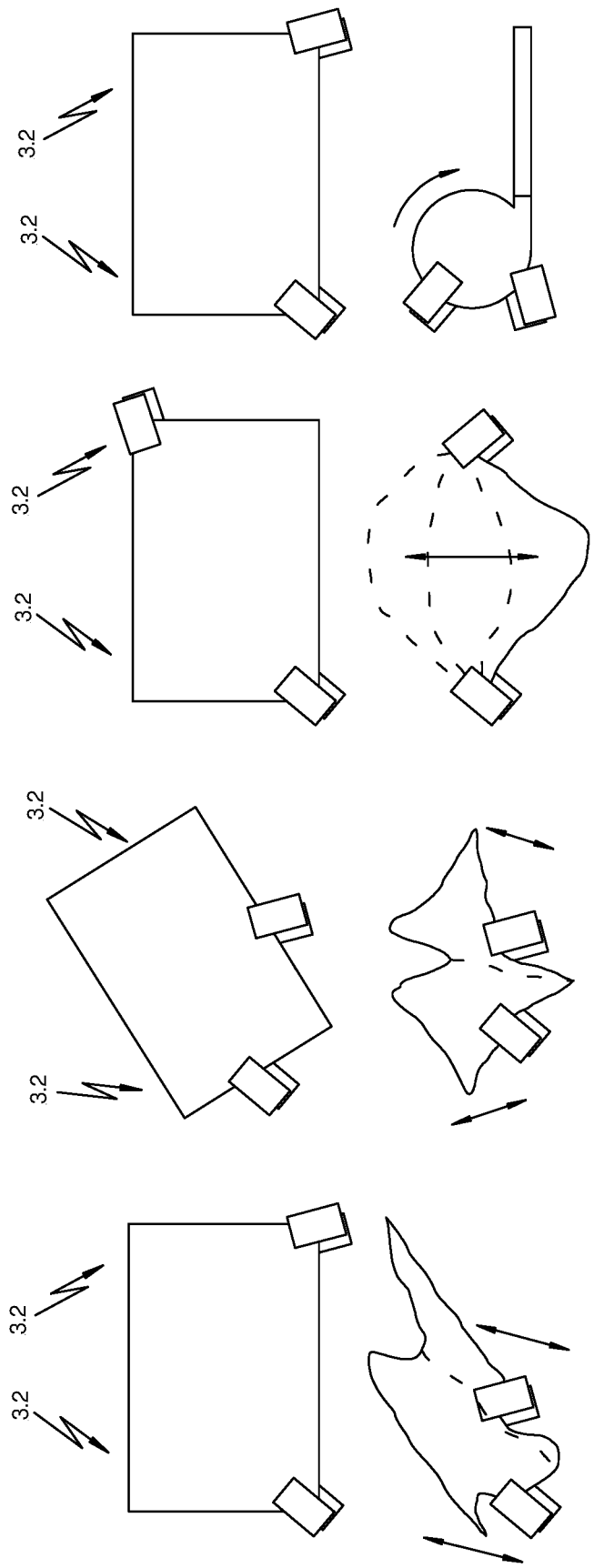
FIG. 13: handling steps for substrate sheets by gripper systems of a dual-arm robot.

FIG. 13 shows several movements of the dual-arm robot 3.1 that can be carried out for different applications and substrates. The selection of movements to be carried out can be predefined, for example, or be inferred from measured values. Additionally, the substrate sheets can be moved vertically through a configuration of two parallel tubes prior to being deposited, which preferably continuously bends the defined number of substrate sheets during the upward movement from the front and back, in particular alternately. The resulting relative movement between the individual substrate sheets can thus represent another separation step.

Furthermore, the substrate sheets can also be aerated, for example while the substrate sheets are being freed by the gripper systems 3.2 of the dual-arm robot 3.1. In particular, air can be blown between the substrate sheets while the substrate sheets are being freed by the defined movement by means of the gripper systems 3.2 of the dual-arm robot 3.1. The layer of substrate sheets 'floats" as a result of the substrate sheets only being held in two defined locations by the gripper systems 3.2.

A deposition, collection and alignment of the substrate sheet can be carried out by depositing the gripped partial piles onto the deposition table or jogging table 8. However, it is likewise conceivable for a jogging device to be integrated on the deposition table. This ensures that the substrate sheets are positioned on a pallet 5 or non-stop system pallet 5 while maintaining the register. The substrate sheets can be collected on a jogging device, in particular the jogging table 8, in reams of 1,000 to 10,000 sheets, for example, and be aligned. Thereafter, the collected substrate sheets can be transferred onto a pallet 5 or non-stop system pallet 5, and the pallet 5 or non-stop system pallet 5 can be fed into the feeder 1.1 or non-stop feeder 1.1 of the processing machine 1. This can be carried out without further manipulation by the operator for the direct pile change in the feeder 1.1 or non-stop feeder 1.1 of the processing machine 1, in particular the printing press or final processing machine, for example for cutting and/or inspection.

While a preferred embodiment of a substrate handling system comprising a robot cell, and a method for operating the same, in accordance with the present invention, has been set forth fully and completely hereinabove, it will be apparent to one of skill in the art that various changes could be made thereto, without departing from the true spirit and scope of the present invention which is accordingly to be limited only by the appended claims.

The invention claimed is:
1. A substrate handling system, comprising;
an infeed system (2) for feeding stacked substrates;

processing machine (1) for processing the stacked substrates;

a robot cell (3) between the infeed system (2) and the processing machine (1), wherein the robot cell (3) includes at least one gripper system (3.2) for handling a plurality of the stacked substrates, the robot cell (3) being configured whereby selectively differently stacked ones of the stacked substrates feedable by the infeed system (2) are handled, the infeed system (2) feeding substrate piles (4) made of substrates present in containers (2.3) and separated by stacking aids (6, 7), the robot cell (3) comprising a dual-arm robot (3.1), which dual-arm robot grips a partial pile of one of the substrate piles (4).

2. The substrate handling system according to claim 1, wherein the infeed system (2) feeds substrate piles (4) made of substrates that are stacked without being separated and stages one of the substrate piles (4) in a defined space (2.1) with respect to the robot cell (3, 3.1).

3. The substrate handling system according to claim 1, wherein a deposition table (8) is provided, onto which deposition table the gripped partial piles can be deposited by the at least one gripper system (3.2), and wherein a substrate pile of the gripped partial piles is (4) formed between the deposition table (8) and the processing machine (1).

4. The substrate handling system according to claim 1, wherein the processing machine (1) comprises a non-stop feeder (1.1), and the processing machine (1) is fed substrate piles (4) composed of stacked partial piles without interruption.

5. The substrate handling system according to claim 1, wherein the at least one gripper system (3.2) removes stacking aids (6, 7) from fed substrate piles (4) and from containers (2.3), and wherein the robot cell (3) has at least one of a collection space and a collection container for the stacking aids (6, 7), and wherein the at least one gripper system (3.2) one of is configured to feed stacking aids (6, 7) to the collection space and to the collection container.

6. The substrate handling system according to claim 1, wherein at least one measuring system (9) for use in ascertaining a number of fed substrate sheets is assigned to the robot cell (3), and one of wherein the measuring system (9) is liftable and the substrate pile (4) is lowerable, while a feeler (9.1) of the measuring system (9) is located between substrate sheets located, at least in areas, directly on top of one another.

7. The substrate handling system according to claim 1, wherein a or the measuring system (9) is assigned to one of a robot arm of a robot (3.1), and to a separate one of an arm and a frame (10), in an area of a staging space (2.1) of the infeed system (2).

8. The substrate handling system according to claim 1, one of wherein the infeed system (2) feeds substrate piles (4) of ones of substrates that are stacked without being separated and of substrates separated by stacking aids (6, 7) and which substrates are present in the containers (2.3), which are located on pallets (5), by the use of a logistic system (2.2) to one of a lifting element of a staging space (2.1), and wherein the infeed system (2) comprises a logistic system (2.2), by the use of which logistic system (2.2) empty pallets (5) are stored in one of an area of the robot cell (3, 3.1) and in a magazine.

9. The substrate handling system according to claim 8, wherein the staging space (2.1) includes one of a lifting frame for vertically displacing fed pallets (5) and at least one hold-down device for at least temporarily holding down substrates.

10. A method for operating a substrate handling system, including;

providing an infeed system (2) for feeding stacked substrates;

providing a processing machine (1) for processing the stacked substrates;

providing a robot cell (3) between the infeed system (2) and the processing machine (1), and configuring the robot cell (3) having at least one gripper system (3.2), for handling a plurality of substrates;

feeding substrate piles (4) made of selectively differently stacked substrates the substrate piles (4) being made of substrates separated by stacking aids (6, 7) and being present in containers (2.3) using the infeed system (2); and using the at least one gripper system for gripping counted partial piles made of the fed substrate piles (3.2).

11. The method according to claim 10, further including one of staging (4), a substrate pile (4) and a container (2.3) in a defined space (2.1) with respect to the robot cell using the infeed system (2) (3, 3.1), and separating the substrates of the particular partial pile one of from one another and among one another using the at least one gripper system (3.2).

12. The method according to claim 10, further including detecting the fed substrate piles (4) using sensors, and handling partial piles gripped by the at least one gripper system (3.2) corresponding to sensor values detected by using the sensors.

13. The method according to claim 10, further including removing stacking aids (6, 7) during the processing process using a dual-arm robot (3.1) in an automated manner, and feeding the removed stacking aids (6, 7) to one of a collection space, a collection container and a container (2.3) by using the at least one gripper system (3.2).

14. The method according to claim 10, further including gripping ones of pile boards (6) and spacer plates (7) using the at least one gripper system (3.2) of the robot cell (3, 3.1) for handling.

15. The method according to claim 10, further including transferring substrate piles (4) present on a non-stop system pallet (5), which substrate piles (4) have been handled by the robot cell (3, 3.1), to a non-stop feeder (1.1) of the processing machine (1) in an automated manner.

* * * * *